J. M. Allison,
Corn Planter,
N° 84,604.  Patented Dec. 1, 1868.
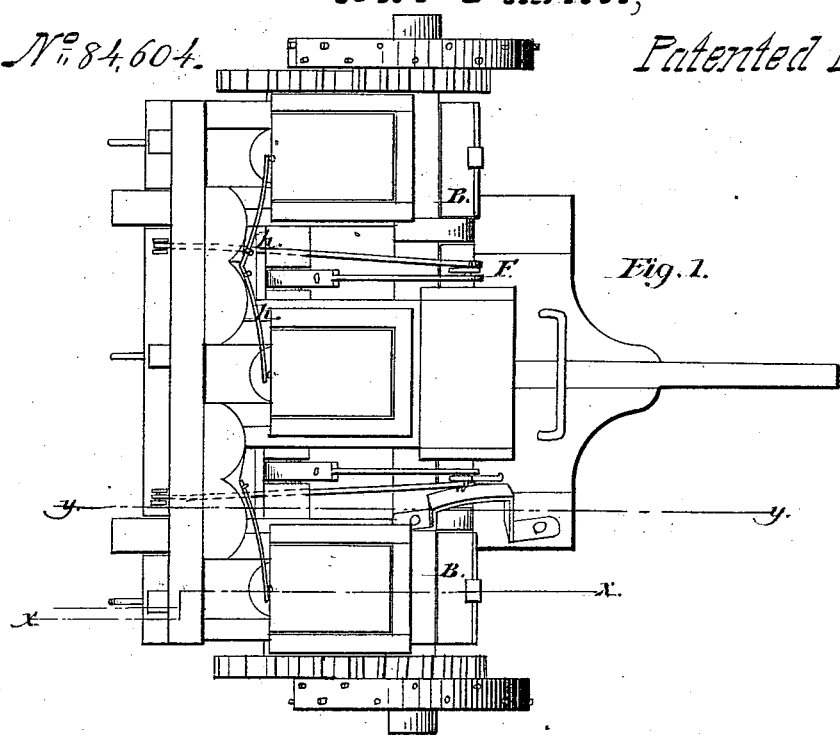
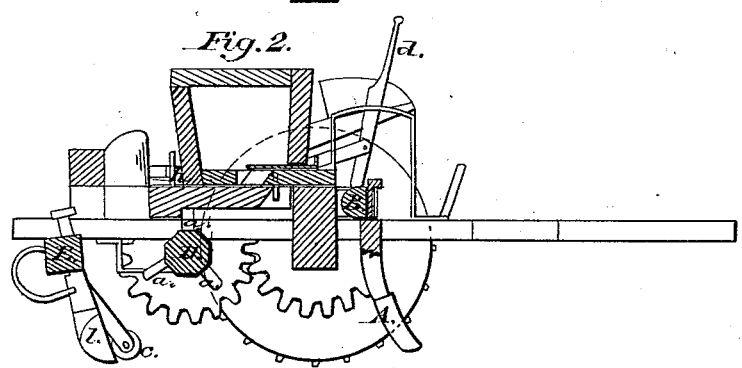
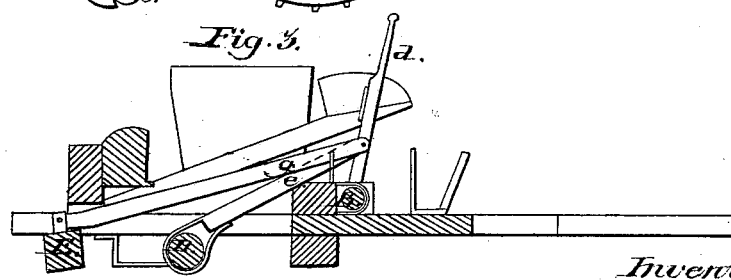
Witnesses:
J. C. Smith
A. Sturgimen
Inventor:
J. M. Allison
Chipman Hosmer &co
Attorneys

J. M. ALLISON, OF CRANBERRY, PENNSYLVANIA.

Letters Patent No. 84,604, dated December 1, 1868.

IMPROVEMENT IN CORN-PLANTERS.

The Schedule referred to in these Letters Patent and making part of the same.

*To all whom it may concern:*

Be it known that I, J. M. ALLISON, of Cranberry, in the county of Venango, and State of Pennsylvania, have invented a new and valuable Improvement in Corn-Planters; and I do hereby declare that the following is a full, clear, and exact description of the construction and operation of the same, reference being had to the annexed drawings, making a part of this specification, and to the letters and figures of reference marked thereon.

Figure 1 of the drawings is a representation of a plan view of my corn-planter;

Figure 2 is a sectional view on the line $x\ x$ of fig. 1; and

Figure 3 is a sectional view on the line $y\ y$ of fig. 1.

The object of my invention is to construct a machine by which three or four rows of corn can be planted at the same time, which said machine shall outrival all others now in use in its simplicity and perfection.

My corn-planter is constructed in the usual form of sulky-corn-planters, but with a long axle-tree arranged to the width of either three or four rows of corn, and the wheels have spikes on their peripheries, and cogs on their inner sides, as represented on the drawings.

On the front side of the axle-tree I adjust three or more small plows, which I call markers. They are marked A on the drawings, and are severally arranged to the proper width for the rows, and serve to prepare a furrow or drill, in which the corn is planted.

These markers are attached to the axle by arranging them in a roller marked B, and then hinging said roller to the axle.

Two beams are mortised into the rear side of the axle, about two feet each from the respective wheels, and extend rearward a sufficient distance to receive and uphold the cog and coverer-rollers, hereinafter mentioned.

Four smaller beams are also mortised or spiked into the upper side of the axle-tree, and extend rearward sufficiently far to receive and support the devices attached thereto, as hereinafter described.

These several beams form a frame-work, for purposes of connection and support, to a large portion of the working-machinery of my corn-planter.

The letter D is a roller, with cog-wheels on each end, that mesh and work in the cogs of the main wheels or drivers. I usually adjust it to the large beams of the frame by means of staples fastened firmly on the under side thereof. These staples should be arranged in such manner as to allow the roller D to oscillate back and forth about a foot, more or less.

I also attach to said roller D a series of pins, marked $a$, for each seed-box, arranged on the frame as hereinafter stated. The office of these pins is to throw open the slides at the bottoms of the seed-boxes, and allow the seed to fall into the furrows.

In the rear of roller D, and adjusted in staples near the rear ends of the large lateral beams above mentioned, is the roller E. I arrange plows on the lower side of this roller, marked $b$, the number of which corresponds to the number of seed-boxes on the frame.

At the sides of the plows last named, which I call the coverers, I adjust small casters, marked $c$, one of which is arranged to each plow. The office of these casters is to run on the surface of the ground, and aid in regulating the depth of the covering-furrow, and in covering the seed.

The letter $d$ is the regulating-lever.

$e$ is a rod, extending from said lever to the roller D; and $g$ is a rod extending from said lever to the roller E.

Similar rods extend to said rollers respectively from the top of an arm on roller B, at the left side of the driver's seat, at the point marked F on the drawings.

My seed-boxes are adjusted on the frame, in the manner shown, and are respectively provided with slides at their bottoms, which are held in place by springs and pins, as shown at $h$, and are operated by the pins $a$ on roller D.

I construct and adjust these several devices in such manner that the slides in the bottoms of the seed-boxes are drawn outward three times to each revolution of the driving-wheels, the diameter of said wheels being equal to the distance required between each hill of corn.

The office of the lever $d$ and its attachments, including rods $e$ and $g$, and their duplicates on the opposite side of the driver's seat, is to enable the operator to raise or lower the marking and covering-plows and casters at will, and also to hold the same above the ground, when desirable, for purposes of transportation.

What I claim as my invention, and desire to secure by Letters Patent, is—

A corn-planter, having marking-plows A, rollers B, D, and E, with pins $a$, covering-plows $b$, casters $c$, lever $d$, rods $e$ and $g$, and their duplicates, as described, and springs and pins $h$, operating with slides at the bottoms of the seed-boxes, all constructed, arranged, and operating substantially as herein specified.

In testimony that I claim the above, I have hereunto subscribed my name, in the presence of two witnesses.

J. M. ALLISON.

Witnesses:
H. J. SAYERS,
S. B. ALLISON.